United States Patent [19]

Workens

[11] 4,135,008
[45] Jan. 16, 1979

[54] METHOD OF SILVERING MIRRORS

[75] Inventor: Frank M. Workens, Jamestown, N.Y.

[73] Assignee: Falconer Plate Glass Corporation, Falconer, N.Y.

[21] Appl. No.: 853,410

[22] Filed: Nov. 21, 1977

[51] Int. Cl.$^2$ .............................................. B05D 1/02
[52] U.S. Cl. ...................................... 427/168; 118/300
[58] Field of Search ............... 427/162, 163, 164, 168, 427/426; 118/300, 324; 65/30 R, 60 C, 1 NQ

[56] References Cited

FOREIGN PATENT DOCUMENTS 524753  8/1940  United Kingdom ..................... 427/168
537987  7/1941  United Kingdom ..................... 427/168

*Primary Examiner*—Morris Kaplan
*Attorney, Agent, or Firm*—Buell, Blenko & Ziesenheim

[57] ABSTRACT

A method and apparatus are provided for silvering glass at higher than normal deposition efficiencies by premixing a silver solution, a caustic solution and a reducing solution and immediately spraying the mixture onto a glass to be coated through a large orifice spray nozzle. The spray nozzle is one which provides an orifice large enough to pass the total volume of mixtures required for silvering through a single opening with a defined spray pattern, preferably in the form of a conical spray.

3 Claims, 7 Drawing Figures

METHOD OF SILVERING MIRRORS

This invention relates to methods of making mirrors and particularly to methods and apparatus for applying silver to mirrors to attain higher efficiency of silver deposition on the mirror at lower temperatures.

Silver is applied to mirrors generally in the form of three separate solutions, a silver solution, a reducer solution and a caustic solution. Generally, these solutions have been applied separately from three spray heads directed onto the glass to be silvered at a common point, so that the three solutions meet on the glass. This was done for the reason that when the solutions meet there is an immediate reaction with silver being reduced which tends to clog lines and sprays. Generally these spray heads are assembled in multiple arrays, e.g., five sets of three heads in succession on a traversing assembly which moves back and forth transversely across a conveyor carrying the glass sheet to be silvered. Such arrays of sprays are very heavy and the glass must be at an elevated temperature in order to attain the maximum efficiency. An alternative practice has been to premix the silver and caustic and to introduce the mixture through one spray nozzle and the reducer through another. This reduces the number of spray nozzles but all other problems remain the same. One of the major problems in silvering mirrors is that the efficiency of deposition of silver on the glass is related to the thoroughness of mixing of the three solutions. In all prior art practices, the average efficiency of silver deposition is about 85%, with efficiencies generally running between 80% and 90%, depending upon a variety of factors of which temperature is an important factor. In prior art practices, a temperature of at least about 120° F. is necessary in order to obtain efficiency of deposition. With energy sources as they are at present, this has become a serious problem.

I have discovered a method of silvering which produces much higher efficiencies of silver deposition using less expensive and complex apparatus, with less maintenance and at lower temperatures. I have found that with appropriate controls and equipment all three of the solutions can be premixed and applied through a single nozzle at lower temperatures with a marked increase in the efficiency of silver deposition.

Preferably I provide a mixing manifold having an outlet for mixed solution, an inlet for silver solution and an inlet for caustic solution on one side of the outlet so that silver solution and caustic solution are mixed together prior to reaching the outlet, an inlet for reducing solution on the side of the outlet opposite the silver solution inlet and means for delivering the reducer solution to the reducer inlet and to the outlet at a slightly higher volume or pressure than that of the silver and caustic solutions so that the mixture of silver and caustic solutions cannot enter the reducer solution inlet side of the manifold and a nozzle on the manifold oulet delivering a large volume spray onto the glass being silvered, said nozzle having an orifice sufficiently large to pass the total volume of mixture through a single hole in a defined pattern. Preferably I use a hollow conical spray but a solid conical spray may also be used, with the entire silvering solution being applied through a single large volume uni-mix nozzle.

In the foregoing general description, I have set out certain objects, purposes and advantages of my invention. Other objects, purposes and advantages of this invention will be apparent from a consideration of the following description and the accompanying drawings in which, FIG. 1 is a schematic end view of a typical prior art silvering line using a three nozzle assembly;

Figure 1:
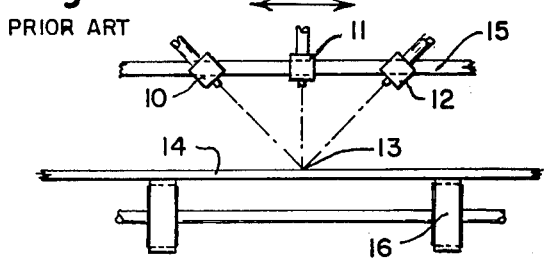
Figure 2:
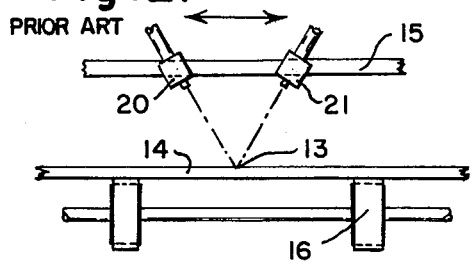
FIG. 2 is a schematic end view of a prior art silvering line using a two nozzle assembly.
Figure 3:
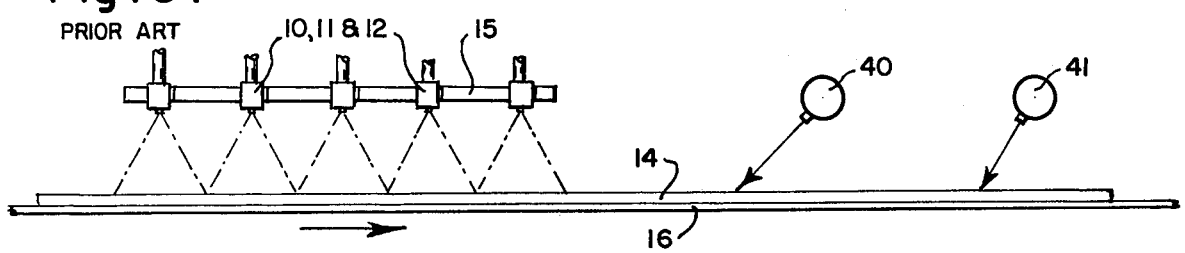
FIG. 3 is a side elevational schematic view of a silvering line using either of the assemblies of FIGS. 1 and 2.

Referring to the drawings, I have illustrated a typical prior art apparatus and method of silvering in FIGS. 1 through 3. In FIG. 1, I illustrate a conventional three nozzle arrangement in which three spaced fan nozzles 10, 11 and 12 are directed at a common point 13 on a glass 14 to be coated. Nozzle 10 is connected to a source of silver solution (not shown), nozzle 11 is connected to a source of caustic solution (not shown) and nozzle 12 is connected to a source of reducing solution (not shown). The three nozzles are mounted on a carrier 15 carrying 5 successive arrays of such heads (see FIG. 3). The carrier is traversed transversly back and forth across the glass to be coated as the glass moves along conveyor 16 from left to right, viewing FIG. 3. In FIGS. 2 and 3, I have illustrated a two nozzle system in which nozzle 20 receives a premixed solution of silver solution and caustic while nozzle 21 receives a reducing solution. Again the paired nozzles are fixed on a carrier 15 in an array of 5 successive sets which move back and forth transversely across the glass as the glass moves on the conveyor 16. An assembly of nozzles such as shown in FIGS. 1 and 3, for example, will weigh about 35 pounds. The silver being applied will, in many cases, not be uniform but will have parallel lighter and darker streaks transversely across the glass surface caused by the overlapping ends of the spray fans. The efficiencies of both of the arrangements illustrated in FIGS. 1-3 are about 80% to 90% and the temperatures of application generally in the neighborhood of 120° F.

Figure 4:
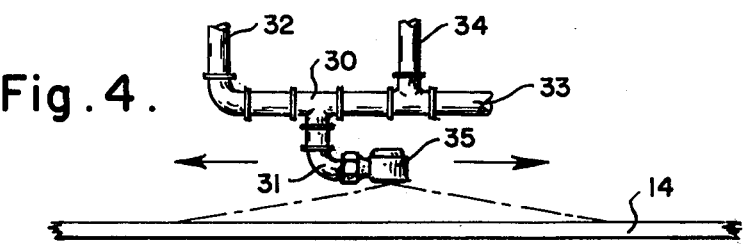
FIG. 4 is a schematic end view of a silvering line according to my invention.
Figure 5:
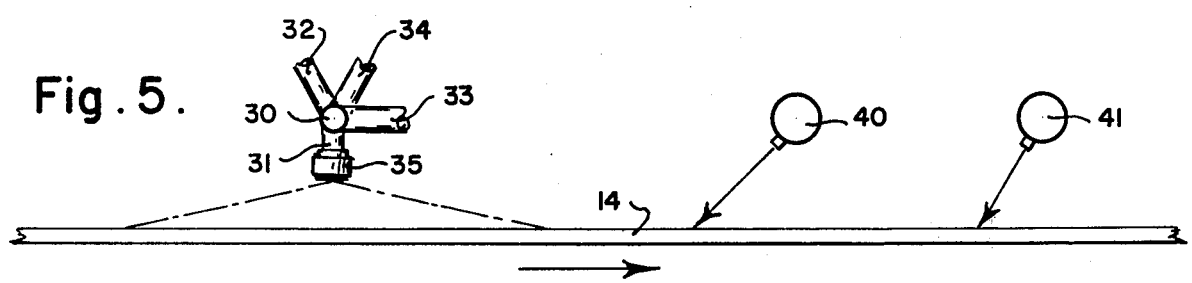
FIG. 5 is a side elevational view of a silvering line of FIG. 4.
Figure 6A:
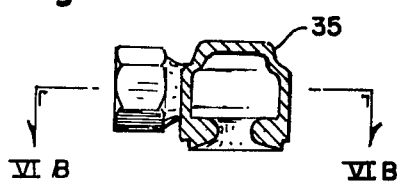
FIGS. 6A and 6B are sectional views of a spray nozzle as used in the apparatus of FIGS. 4 and 5.
Figure 6B:
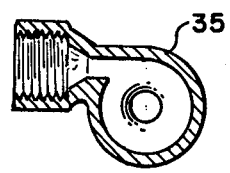

In FIGS. 4-6, I have illustrated an apparatus according to this invention using a mixing manifold 30 having an outlet 31 intermediate its ends, a reducer solution inlet 32 on one side of outlet 31 and silver solution inlet 33 and caustic solution inlet 34 on the other side of outlet 31. The outlet 31 is connected to a conical spray nozzle 35. The nozzle and manifold are traversed back and forth across the glass precisely as in the case of FIGS. 1 through 3 but there is only a single nozzle involved and the weight is about 3.5 lbs as compared with 35 pounds. In both cases an air knife blow-off 40 removes excess silvering fluid and is followed by a fresh water rinse 41. In the apparatus and method of FIGS. 4-6, the efficiency of silver deposition is in the range 90% to 99% with solution temperatures as low as 100° F. The reducer solution entering inlet 32 is delivered at a slightly higher volume than that of the two other solutions. This is preferably accomplished by means of flow meter controls in the delivery lines which regulate the flow of each solution to manifold 30.

Typical of the efficiencies to be achieved by my process are the following:

Using a manifold set up as shown in FIGS. 4-6 and an airless parasol type nozzle and with the glass at 100° F.

I applied standard silvering solution to a glass surface and the efficiency of deposition was 99.6%.

Using the same manifold set up but substituting a 150° deflector tip nozzle forming a hollow conical spray through a single orifice and glass at 140° F., I applied standard silver solutions with a deposition efficiency of 98.6%.

Again, using the same manifold assembly but with an air conical nozzle and a glass temperature of 120° F. I obtained a deposition efficiency of 95.8%.

Comparing these efficiencies with the 85% average deposition efficiency of the prior art, it is at once apparent that my invention provides a marked improvement over the prior art.

While I have illustrated and described certain preferred practices and embodiments of my invention in the foregoing specification, it will be understood that this invention may be otherwise embodied within the scope of the following claims.

I claim:

1. Method of applying silver solution to a glass surface to be coated with silver comprising the steps of
    a. admixing a solution of silver, a solution of caustic and a solution of reducing agent at a common point prior to delivery to a conical spray nozzle,
    b. immediately delivering all of said admixture of solutions to a said conical spray nozzle capable of delivering all of said admixture through a single orifice under pressure sufficient to form a defined conical spray,
    c. spraying the solution as defined spray through a single orifice on the glass to be coated while moving the glass past the nozzle,
    d. removing excess silvering solution from the glass, and
    e. rinsing the coated glass.
2. The method as claimed in claim 1 wherein the the solution of caustic and the solution of silver are first mixed and the mixture then admixed with the reducing solution immediately ahead of the nozzle.
3. The method as claimed in claim 1 wherein the nozzle is a parasol type spray nozzle.

* * * * *